(12) United States Patent
Ohhashi

(10) Patent No.: US 9,203,992 B2
(45) Date of Patent: Dec. 1, 2015

(54) INFORMATION PROCESSING APPARATUS AND CONTROL METHOD

(71) Applicant: Kenichi Ohhashi, Kanagawa (JP)

(72) Inventor: Kenichi Ohhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/572,968

(22) Filed: Dec. 17, 2014

(65) Prior Publication Data

US 2015/0195417 A1    Jul. 9, 2015

(30) Foreign Application Priority Data

Jan. 7, 2014    (JP) .................................. 2014-000756

(51) Int. Cl.
| | | |
|---|---|---|
| *G06F 15/00* | (2006.01) | |
| *H04N 1/00* | (2006.01) | |
| *G06F 1/16* | (2006.01) | |
| *G06K 15/00* | (2006.01) | |

(52) U.S. Cl.
CPC ............ *H04N 1/0049* (2013.01); *G06F 1/1684* (2013.01); *G06K 15/00* (2013.01); *H04N 1/00893* (2013.01); *H04N 1/00896* (2013.01); *H04N 1/00901* (2013.01); *H04N 2201/0094* (2013.01)

(58) Field of Classification Search
CPC .................................................. H04N 1/00891

USPC ......................................................... 358/1.14
See application file for complete search history.

(56) References Cited

U.S. PATENT DOCUMENTS

| | | | |
|---|---|---|---|
| 2003/0169309 A1* | 9/2003 | Yokoyama ...................... 347/14 |
| 2010/0218021 A1 | 8/2010 | Ma et al. | |
| 2011/0063649 A1* | 3/2011 | Komatsu ...................... 358/1.14 |

FOREIGN PATENT DOCUMENTS

| | | |
|---|---|---|
| JP | 8-171360 | 7/1996 |
| JP | 2003-084352 | 3/2003 |
| JP | 2008-068548 | 3/2008 |

OTHER PUBLICATIONS

Jun. 5, 2015 European search report dated in corresponding European Patent Application No. 15 15 0066.

* cited by examiner

*Primary Examiner* — Saeid Ebrahimi Dehkordy
(74) *Attorney, Agent, or Firm* — Cooper & Dunham LLP

(57) ABSTRACT

An information processing apparatus includes a status indicator that displays status of a battery, a controller that controls an operating mode of the information processing apparatus and supplies power to the status indicator, and an instruction acceptance unit that accepts user instruction to display to the status indicator. The controller turns off the status indicator in transitioning to the energy saving mode, and, in the energy saving mode, turns on the status indicator in response to the instruction acceptance unit accepting the user instruction to display and turns off the status indicator in response to the user instruction to display being released.

13 Claims, 10 Drawing Sheets

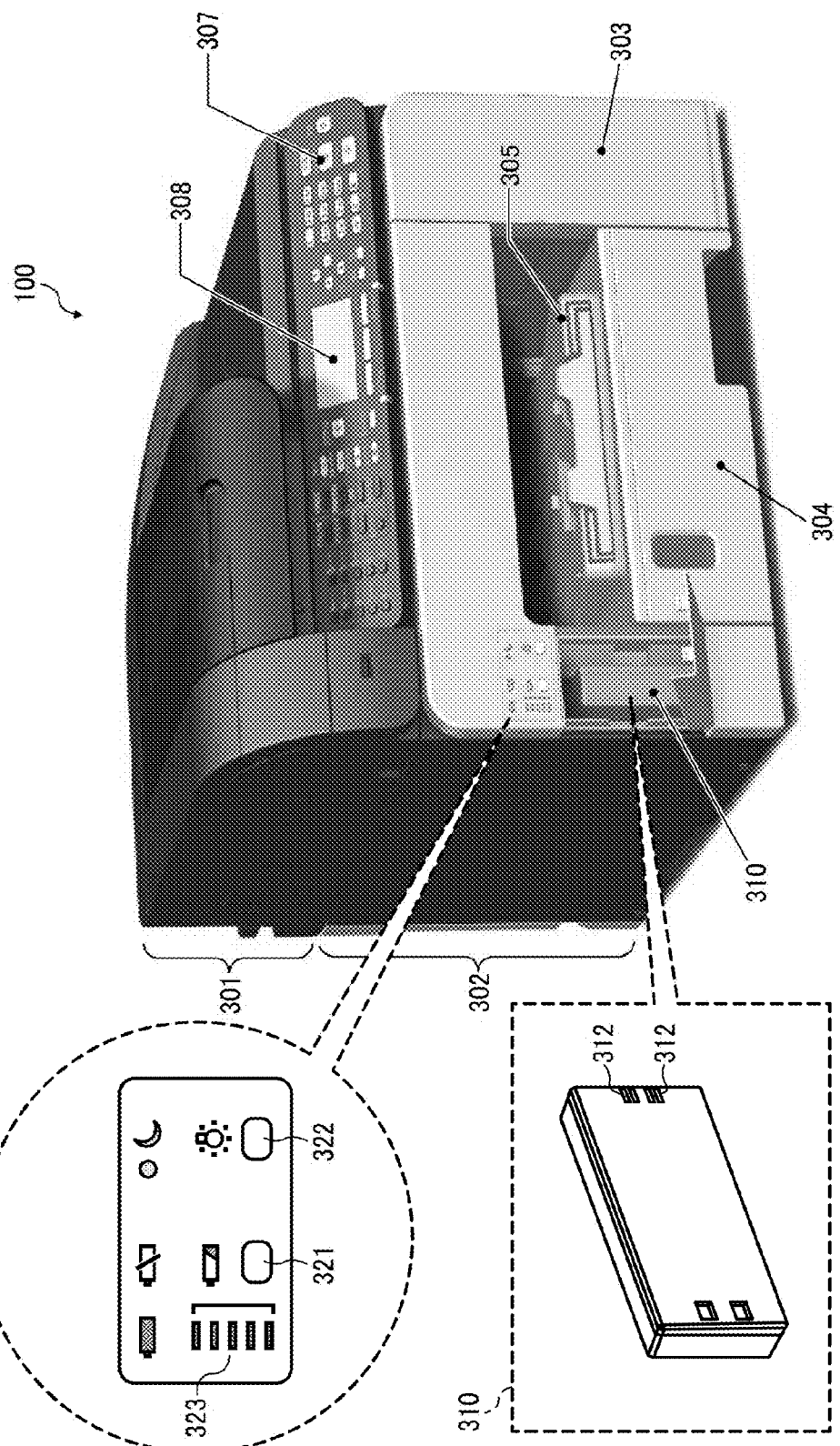

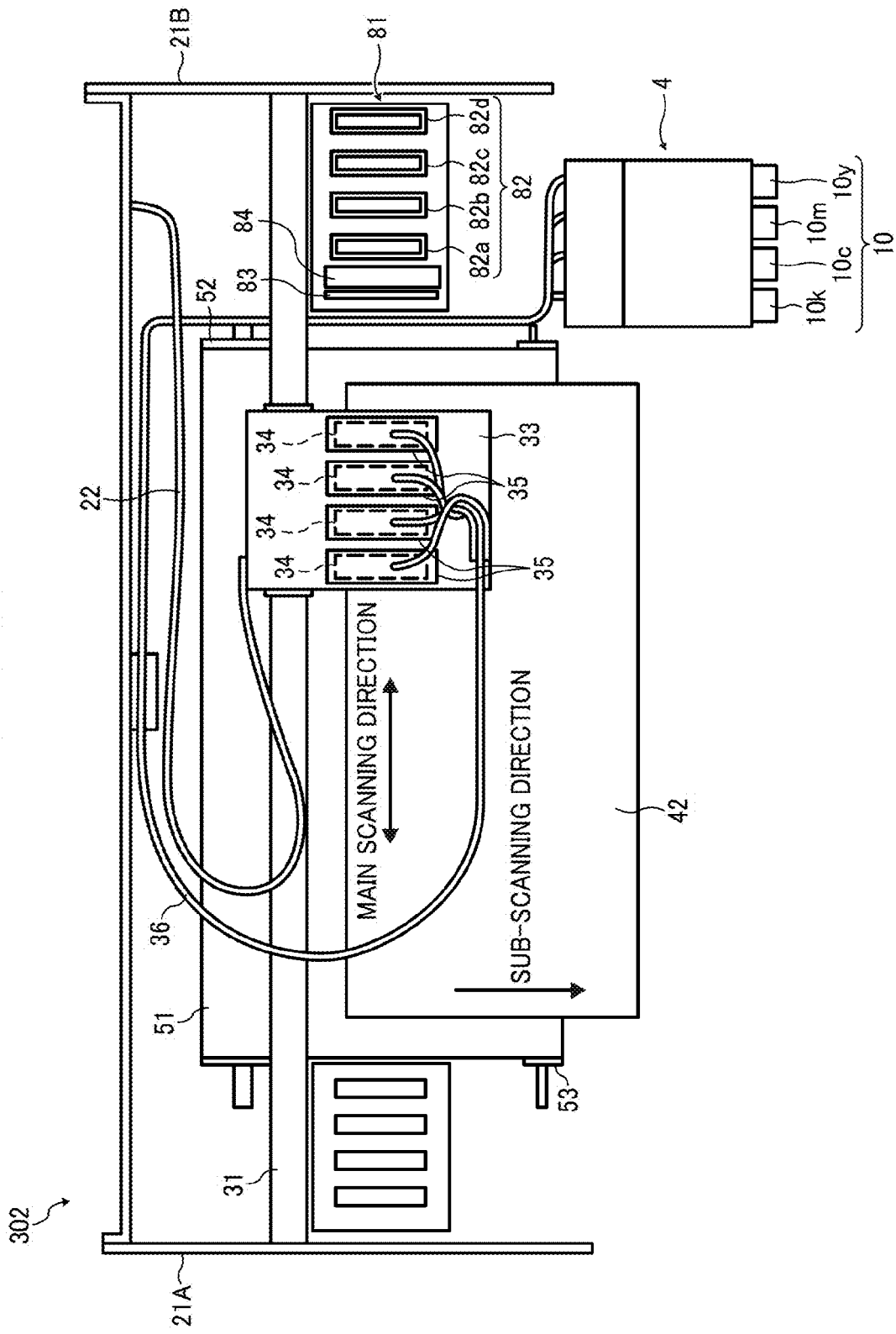

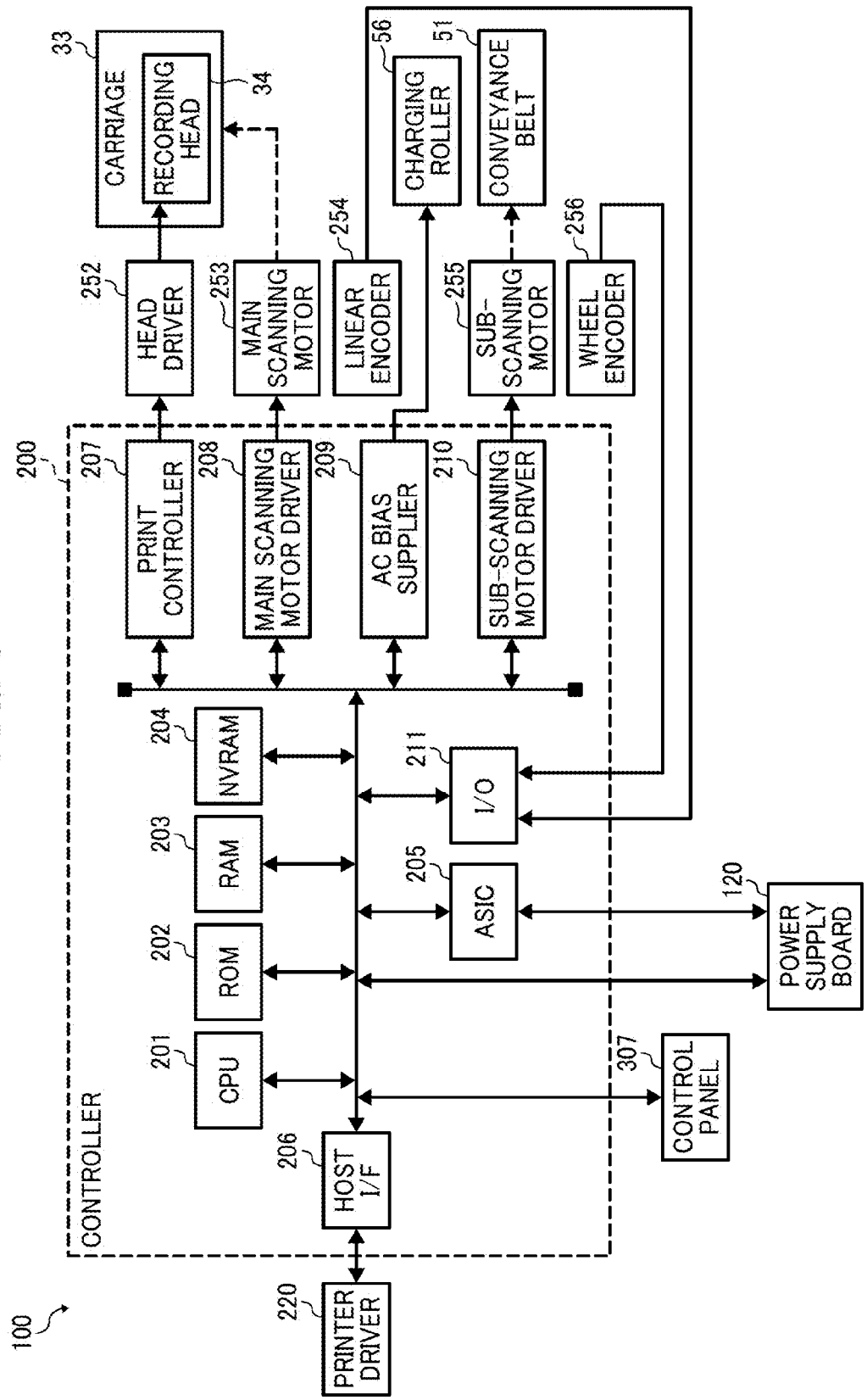

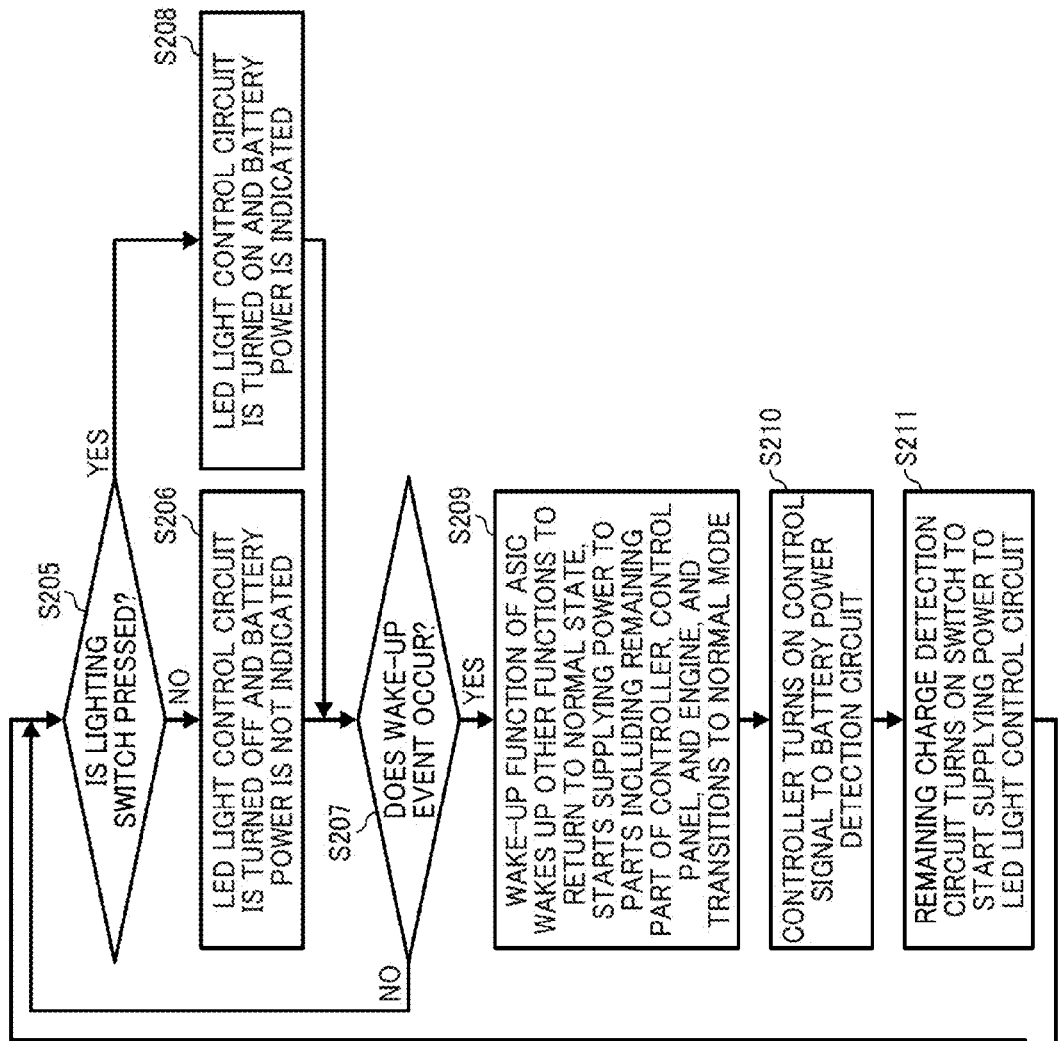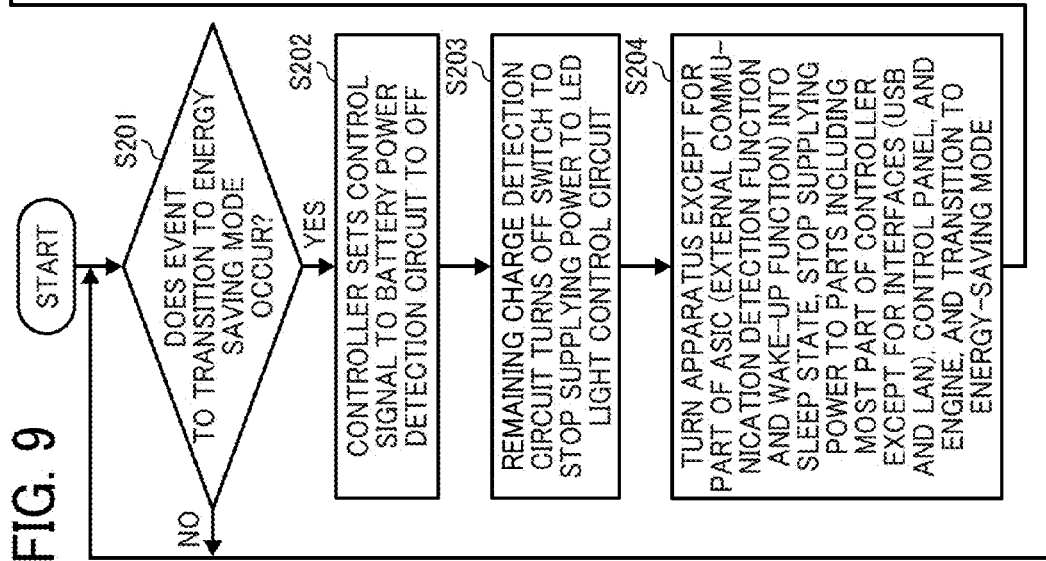
FIG. 9

US 9,203,992 B2

INFORMATION PROCESSING APPARATUS AND CONTROL METHOD

CROSS-REFERENCE TO RELATED APPLICATION

This patent application is based on and claims priority pursuant to 35 U.S.C. §119 to Japanese Patent Application No. 2014-000756, filed on Jan. 7, 2014 in the Japan Patent Office, the entire disclosure of which is hereby incorporated by reference herein.

BACKGROUND

1. Technical Field

The present invention relates to an information processing apparatus, and more particularly, a battery-powered information processing apparatus, and a control method performed by the information processing apparatus.

2. Background Art

Conventionally, age forming apparatuses that are equipped with a secondary battery (hereinafter simply "battery") are known. Given the premium placed on reducing power consumption while operating on battery power, energy-efficient technologies that indicate the charge remaining on the battery using light emitting elements or LEDs are known as well. For example, a technology exists that attempts to save power by using sets of multiple LEDs the number of which corresponds to the remaining battery power; when the battery is being used, the charge remaining on the battery is indicated by lighting up the appropriate number of LEDs corresponding to the remaining charge, but when the battery is not being used, only a single LED indicating the highest charge remaining blinks on and off intermittently.

SUMMARY

An example embodiment of the present invention provides a novel information processing apparatus that includes a status indicator that displays the status of a battery, a controller that controls an operating mode of the information processing apparatus and power supply to the status indicator, the operating mode at least including an energy saving mode, and an instruction acceptance unit that accepts user instruction for displaying the status of the battery using the status indicator, The controller stops power supply to the status indicator when the information processing apparatus transitions to an energy saving mode, and, in the energy saving mode, starts power supply to the status indicator in response to the instruction acceptance unit accepting the user instruction for displaying and stops power supply to the status indicator in response to releasing the user instruction for displaying.

Further example embodiments of the present invention provide a control method for the information processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 1 is a diagram illustrating exterior appearance of a multifunctional peripheral (MFP) as an embodiment of the present invention.

FIGS. 2A and 2B are diagrams illustrating an internal configuration of a printer unit of the MFP as an embodiment of the present invention.

FIG. 3 is a diagram illustrating a system configuration of the MFP as an embodiment of the present invention.

FIG. 9 is a flowchart illustrating a process of controlling energy consumption and indicating charge remaining on the battery executed by the MFP as an embodiment of the present invention.

DETAILED DESCRIPTION

Figure 2A:
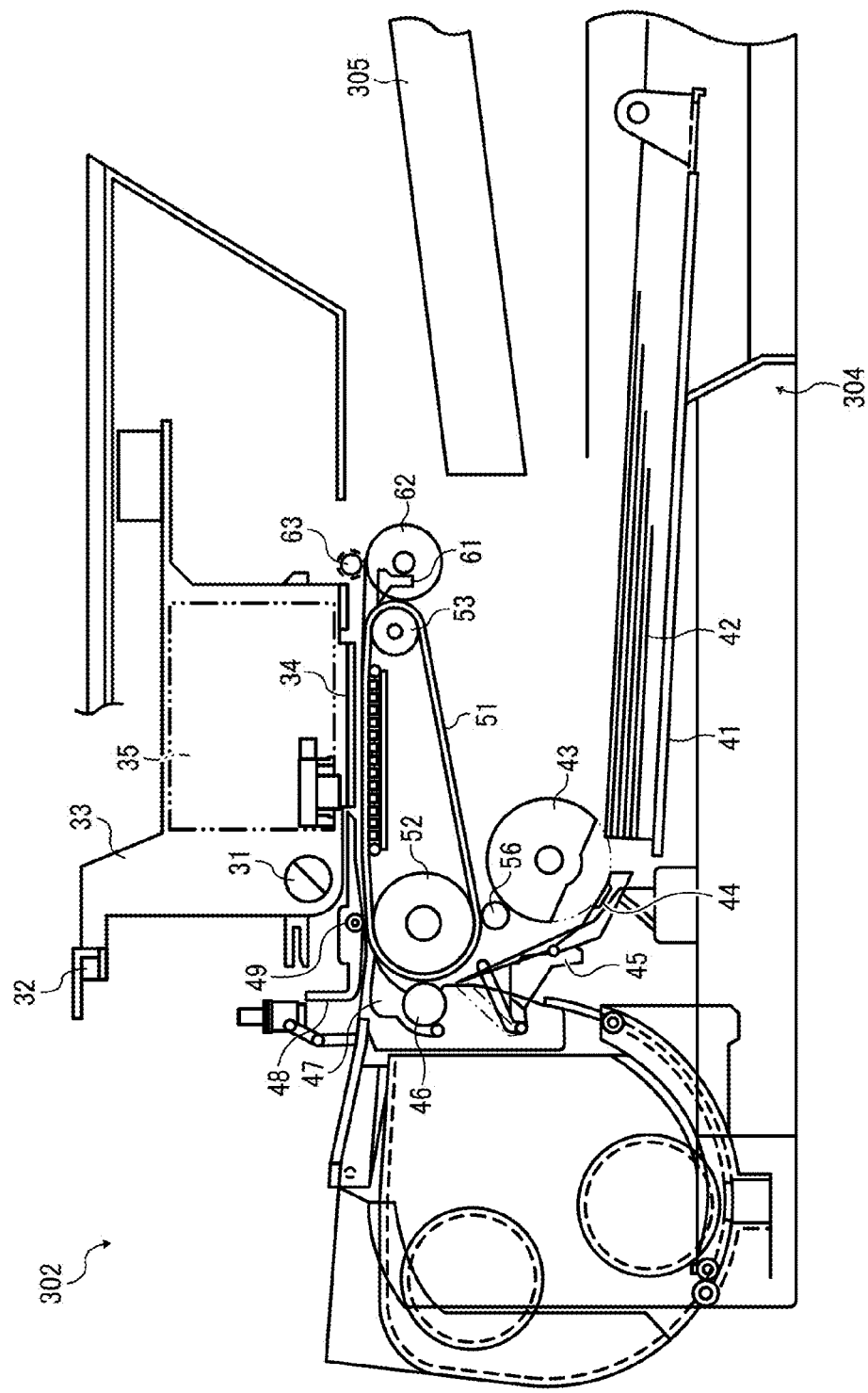

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiment, a multifunctional inkjet printer 100 is taken as an example of the information processing apparatus. In the figures that are referred to below, the same symbols are used for the same elements and redundant descriptions omitted.

In the following embodiment, a novel information processing apparatus that can use the battery as power source is provided. The information processing apparatus indicates status of the battery in accordance with an operation mode of the information processing apparatus, and the information processing apparatus can reduce power consumption for indicating status.

FIG. 1 is a diagram illustrating exterior appearance of a multifunctional inkjet printer (hereinafter referred to as MFP) 100 in this embodiment. The MFP 100 includes a scanner unit 301 and a printer unit 302, and the MFP 100 includes functions such as a copy function, print function, facsimile function, and a function of printing data stored in an external storage (e.g., a USB memory and a digital camera) directly.

The printer unit 302 includes space 303 where ink cartridges are inserted, a paper feed tray 304, a paper output tray 305, a control panel 307, and a liquid crystal panel 308.

Here, the MFP 100 in this embodiment can select a large capacity battery that consists of lithium-ion batteries or nickel-hydrogen battery etc. as power source in addition to commercial power supplied by an alternating current adapter (not shown in figures). In FIG. 1, a dedicated battery pack 310 is used as the high-capacity battery. If the battery back 310 is mounted from the front surface of the printer unit 302, it is possible to supply power from terminals 312 to the apparatus.

Regarding the battery back 310 (hereinafter referred to as the battery 310), there are LEDs 323 that visually indicates charge remaining on the battery 310 provided on the front surface of the printer unit 302. In order to reduce power consumption, the LEDs 323 do not light up in case of energy saving mode and the power is turned off unless a switch 321 is pressed (described in detail later). The LEDs 323 function as a status indicator, and the switch 321 functions as an instruction acceptance unit. Preferably, the LEDs 323 and the switch 321 are incorporated as one unit. By pressing a switch 322, the surroundings of the paper ejection tray 305 are illuminated by a LED lightning (not shown in figures).

The MFP is described from its exterior appearance above. The internal configuration of the printer unit 302 of the MFP 100 is described below with reference to FIGS. 2A and 2B.

FIG. 2A is a diagram illustrating the side view of the internal configuration of the MFP 100, and FIG. 2B is a diagram illustrating the top view of the internal configuration of the MFP 100.

A guide rod 31 and a stay 32 bridge a left side panel 21A and a right side panel 21B. A carriage 33 is supported by the guide rod 31 and the stay 32 in the main scanning direction, The carriage 33 can move in the direction shown by the arrow (in the main scanning direction) driven by the main scanning motor (not shown in figures).

In the carriage 33, four recording heads 34 that eject ink droplets in yellow (Y), cyan (C), magenta (M), and black (K) are mounted perpendicular to the main scanning direction, and a controller (not shown in figures) controls the ink droplets ejection of the recording heads 34 via a harness 22.

Further, the carriage 33 includes four sub-tanks 35 for supplying ink to each of the recording heads 34. Ink is supplied from ink cartridges 10 (10k, 10c, 10m, and 10y) loaded on a cartridge loading unit 4 to the corresponding sub-tank 35 via an ink feeding tube 36.

The paper feeding unit for feeding paper 42 from the paper feed tray 304 includes a semicircle paper feed roller 43 for feeding the paper 42 loaded on a paper loading plate 41 one by one separately, a separating pad 44 located facing to the paper feed roller 43. A guiding member 45, a counter roller 46, a carrying guide member 47, a press member 48, a head press roller 49, and a paper conveyance belt 51 located facing to the recording heads 34.

The paper conveyance belt 51 is entrained around a carrying roller 52 and a tension roller 53, and the paper conveyance belt 51 moves in the direction shown by the arrow (in the sub-scanning direction) by driving the carrying roller with a sub-scanning motor (not shown in figures). In this case, the surface of the paper carrying belt is charged by a charging roller 56. The paper 42 fed from the paper feed unit sticks to the paper conveyance belt 51 electrostatically, and the paper 42 is transferred under the recording heads 34.

In response to the paper 42 transferred under the recording heads 34, the carriage 33 drives the recording heads 34 in accordance with the image signal moving in the main scanning direction. As a result, the ink droplets are ejected on the still paper 42 in accordance with the image signal, Consequently, in case of finishing recording for one line, the paper 42 is transferred at predetermined distance in the sub-scanning direction, and the recording for next line is performed. Subsequently, similar steps are repeated. Finally, the recording operation finishes in response to receiving an end signal or a signal that indicates that the trailing edge of the paper 42 reaches the recording area. The paper ejection unit for ejecting the paper 42 after finishing recording includes a separation claw 61 for separating the paper 42 from the paper conveyance belt 51, a paper ejection roller 62, and an ejecting roller 63, and the ejected paper 42 is placed in stock on the paper ejection tray 305.

On the right edge of paper surface in the main scanning direction of the carriage 33, there is a maintenance and recovery unit 81 for maintaining the nozzle status of the recording heads 34. The maintenance and recovery unit 81 includes caps 82a, 82b, 82c, and 82d for capping each nozzle surface of the recording heads 34, a wiper blade 83 for wiping the nozzle surface, and a dummy ejection receiver 84 for receiving ink droplets ejected during the dummy ejections for ejecting thickened recording liquid. After finishing recording (printing), the carriage 33 moves to the side of the maintenance and recovery unit 81.

The internal configuration of the MFP 100 in this embodiment is described above. The system configuration of the MFP is described below with reference to FIG. 3. A controller 200 controls the whole part of the MFP 100 and includes a controlling unit that controls transition to operating modes such as energy saving mode and normal mode.

The controller 200 includes a CPU 201, a ROM 202, a RAM 203, a NVRAM 204, and an ASIC 205. The CPU 201 controls carrying the paper 42 and moving the recording heads 34 etc. The ROM 202 stores programs etc. executed by the CPU 201. The RAM 203 stores image data etc. temporarily, and the NVRAM 204 keeps data during the power-off. The ASIC 205 performs various image processing on the image data and processes input/output signals for controlling the whole part of the apparatus. In addition, as described later, the ASIC 205 detects external communication during energy saving mode and recovers the system in response to the external communication.

The controller 200 further includes a host I/F 206 that transmits/receives print data from/to a printer driver 220 in the host, a print controller 207, a main scanning motor driver 208, a sub-scanning motor driver 210, an AC bias supplier 209, and an I/O 211 that inputs signals from a linear encoder 254 and a wheel encoder 256. Examples of the host I/F 206 are Universal Serial Bus (USB) and Network Interface Card (NIC) etc.

The print controller 207 generates driving data for driving the recording head 34 and output the driving data to a head driver 252. The main scanning motor driver 208 drives a main scanning motor 253, and the sub-scanning motor driver 210 drives a sub-scanning motor 255. The AC bias supplier 209 applies high voltage to the charging roller 56. In addition, the controller 200 is connected to the control panel 307 that inputs and displays data necessary for the apparatus and a power supply board 120 that supplies power to the apparatus.

The system configuration of the MFP 100 is described above. The function of the power supply board 120 that controls operating power of the MFP 100 is described below.

Figure 4:
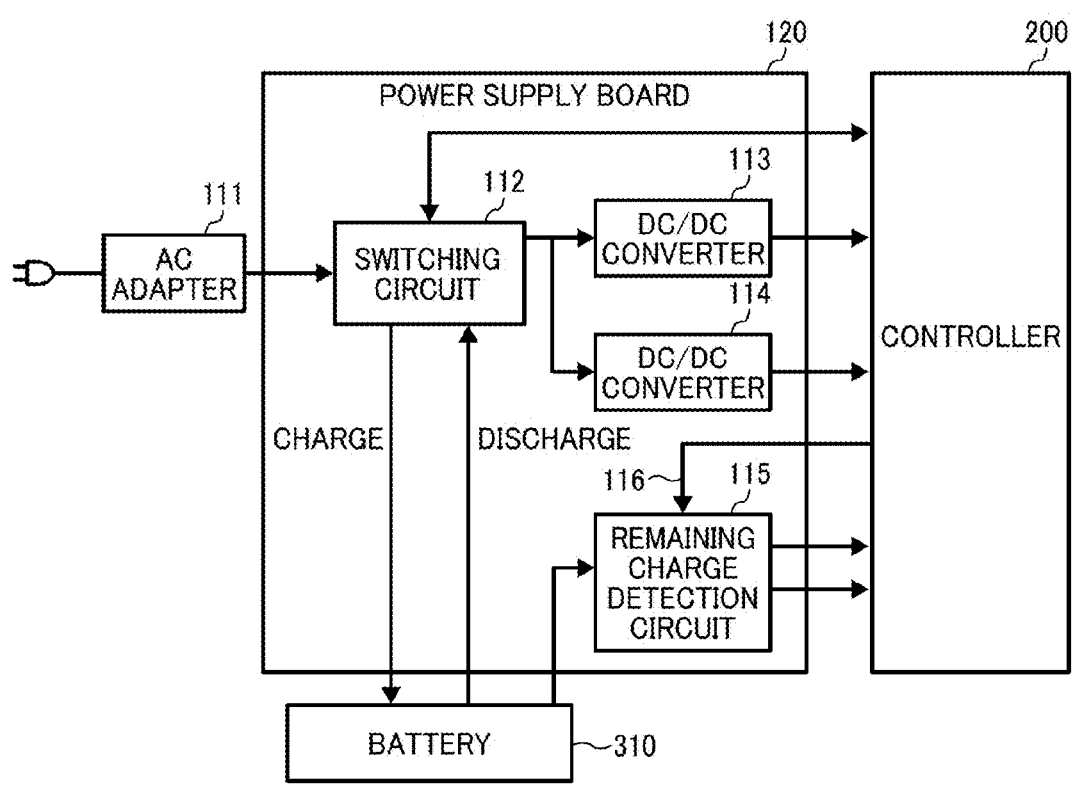
FIG. 4 is a diagram illustrating a configuration of a power supply board included in the MFP as an embodiment of the present invention.

FIG. 4 is a diagram illustrating the configuration of the power supply board 120 included in the MFP 100. The power supply board 120 includes a switching circuit 112, DC/DC converters 113 and 114, and a remaining charge detection circuit 115.

The switching circuit 112 consists of a FET and a control IC. The switching circuit charges the battery 310 using the commercial power supplied via the AC adapter 111 and selects either the AC adapter 111 (i.e., the commercial power) or the battery 310 as the driving power.

The DC/DC converters 113 and 114 generate necessary DC voltage from a single power source supplied from a power supply (either the AC adapter or the battery 310) and supply the DC voltage to the controller 200.

In the remaining charge detection circuit 115, a comparator IC compares voltage of the battery 310 with reference voltages configured using voltage dividing resistors and detects the voltage level of the battery 310 in multiple stages. The detected voltage level is not limited to five-staged as shown in FIG. 1, and it is possible to configure arbitrary levels. The remaining charge detection circuit 115 lights LEDs corresponding to the detected voltage level among multiple LEDs 323. Examples of the status indicator are a unit that indicates the status of the charge remaining stepwise by the number of luminous light emitting elements and a unit that indicates the status of the charge remaining using the light emitting status such as blinking of one or more light emitting elements with single-color or multicolor or using the combination of them.

If the detected voltage level is lower than the second lowest level, the remaining charge detection circuit 115 outputs "a battery low signal" to the controller 200 and notifies the controller 200 that the charge remaining on the battery 310 is getting low. In addition, if the detected voltage level is lower than the lowest level (corresponding to the LED 5), the remaining charge detection circuit 115 outputs "a dead battery signal" to the controller 200 and notifies the controller 200 that the battery 310 is out of power. It should be noted that it is not always necessary to associate the voltage levels that output "the battery low signal" and "the dead battery signal" with the voltage levels that illuminates the LEDs 323, and it is possible to configure unique levels for those voltage levels.

In this embodiment, after receiving a power supply control signal from the controller 200 via a signal line 116, the remaining charge detection circuit 115 further controls lighting of the LEDs 323 that indicates the charge remaining of the battery. The remaining charge detection circuit is described in detail later with reference to FIGS. 8 and 9. Power supply control is described below.

The control IC in the switching circuit 112 acquires power supply information in response to turning on the apparatus. The power supply information includes whether or not the AC adapter 111 is connected and the battery 310 is connected.

If both of the two power supplies are connected when the apparatus is turned on, the switching circuit 112 selects the AC adapter 111 as the power supply source first. Subsequently, the switching circuit 112 selects either the AC adapter 111 or the battery 310 as the power supply source sequentially in accordance with the instruction from the controller 200. In addition, in case of detecting that either one of the two power supplies is disconnected, the switching circuit 112 selects the connected power supply as the power supply source immediately. For example, if the plug of the AC adapter 111 is disconnected or the battery 310 is disconnected, it is detected that it is not connected.

The function that the power supply board 120 performs is described above. "A battery usage mode" that the MFP 100 in this embodiment includes is described below.

In this embodiment, in "the battery usage mode", if both the commercial power and the battery are available as the power supply, the battery is used preferentially in a predetermined time slot.

In this embodiment, in configuring the battery usage mode, the MFP 100 accepts input for following three items by user operation:

(1) Whether or not the battery usage mode is to be used
(2) Date when the battery usage mode is enabled (every day/day setting/date setting etc.)
(3) Time slot when the battery usage mode is used (start time/end time)

Figure 5:
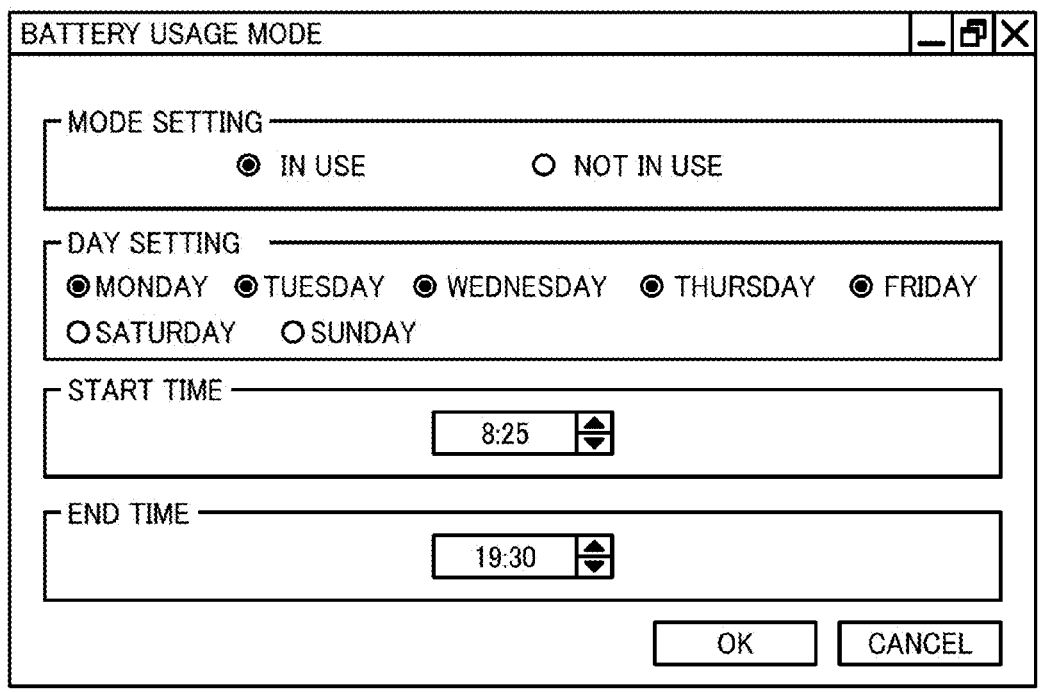
FIG. 5 is a diagram illustrating a screen for configuring a battery usage mode that a printer driver provides as an embodiment of the present invention.

In this embodiment, the above items can be input from the control panel 307. Alternatively, it is possible to accept input via a printer driver in a personal computer (PC) connected to the MFP 100. FIG. 5 is a diagram illustrating an UI screen for configuring a battery usage mode that a printer driver provides The configuration information regarding the battery usage mode is stored in the NVRAM 204 included in the controller 200. The battery usage mode is implemented by executing a dedicated program stored in the ROM 202 by the CPU 201. The battery usage mode that the controller 200 implements is described below with reference to the flowchart shown in FIG. 6.

Figure 6:
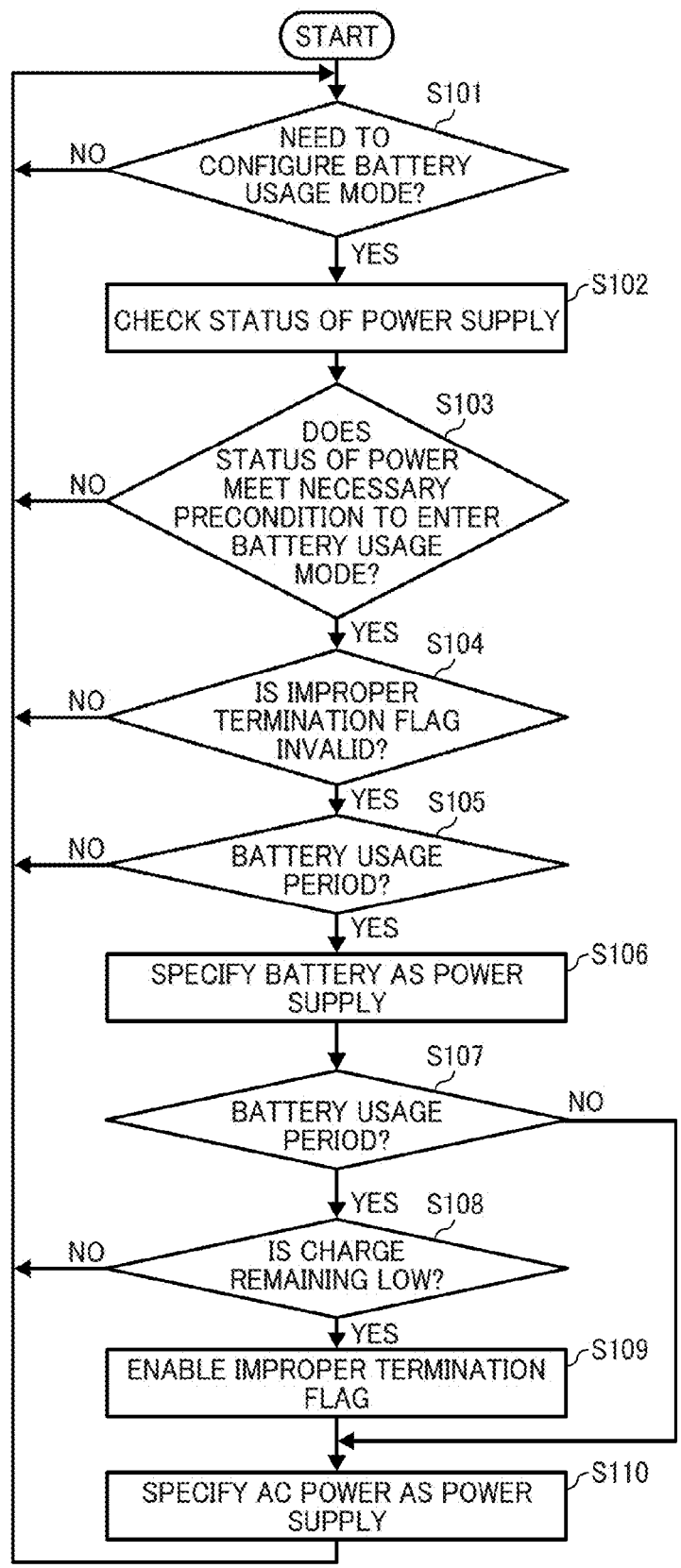
FIG. 6 is a flowchart illustrating a process performed by the MFP as an embodiment of the present invention.

In FIG. 6, after turning on the main power of the MFP 100, the controller 200 starts up in response to power from the power supply board 120, and the controller 200 starts performing the following steps. After starting up, the controller 200 first refers to the configuration information stored in the NVRAM 204 and determines whether or not the battery usage mode is to be used in S101. As a result, step S101 is repeated as long as the battery usage mode is not to be used (NO in S101). By contrast, if the battery usage mode is to be used (YES in S101), the process proceeds to S102.

In S102, the controller 200 checks the status of the power supply as described below. First, the controller 200 checks the power supply information (whether or not the AC adapter 111 is connected and whether or not the battery 310 is connected) at the switching circuit 112 in the power supply board 120. In response to the query, whether or not the AC adapter 111 is connected and whether or not the battery 310 is connected is detected from the power supply information provided by the switching circuit 112. In addition, it is detected whether or not there is "the battery low signal" and "the dead battery signal" input from the remaining charge detection circuit 115 in the power supply board 120.

Next, in S103, after specifying whether or not the AC adapter 111 is connected, whether or not the battery 310 is connected, and the status of the power supply from whether or not there is the input signal from the remaining charge detection circuit 115, it is determined whether or not the status of the power supply meets the necessary precondition to enter the battery usage mode.

Here, in this embodiment, the precondition to enter the battery usage mode is that both the AC adapter 111 and the battery 310 are available as the power supply. Specifically, the condition to enter the battery usage mode is that both the AC adapter 111 and the battery 310 are connected in the state that can supply power and the charge remaining on the battery 310 is enough (more specifically, neither "the battery low signal" nor "the dead battery signal" is detected), In S103, as long as it is determined that the status of the power supply does not satisfy the condition to perform the battery usage mode (NO in S103), the process returns to S101 and the steps described above are repeated. If it is determined that the status of the power supply meets the necessary preconditions to enter the battery usage mode (YES in S103), the process proceeds to S104.

It is determined whether or not the improper termination flag is invalid in S104. If the improper termination flag is valid (NO in S104), the process returns to S101 and the steps described above are repeated. In this embodiment, the "improper termination flag" is for managing history that the active power source is changed from the battery to the commercial power before the scheduled battery usage period expires. In the battery usage period while the battery usage mode is activated, the improper termination flag is enabled in response to receiving "the battery low signal" from the remaining charge detection circuit 115, and the improper termination flag is reset when the battery usage period expires.

By contrast, if it is determined that an improper termination flag is invalid in S104 (YES in S104), the process proceeds to S105. In S105, after comparing the current date/time with the configuration information stored in the NVRAM 204 (date and time slot when the battery usage mode is activated), it is determined whether or not the current time belongs to the time slot when the battery usage mode is activated (hereinafter referred to as battery usage period).

As a result, if it is determined that the current time does not belong to the battery usage period (NO in S105), the process returns to S101, and the steps described above are repeated. By contrast, if it is determined that the current time belongs to the battery usage period (YES in S105), the process proceeds to S106, and the power supply board 120 is instructed to select the battery 310 as the power supply. While the battery usage mode is activated, it is maintained to select the battery 310 as the driving power.

Next, the process proceeds to S107. After comparing the current time with the configured battery usage period, it is determined whether or not the current time belongs to the battery usage period again. As a result, if it is determined that the current time belongs to the battery usage period (YES in S107), the process proceeds to S108, and it is determined whether or not the charge remaining on the battery is decreasing. As a result, as long as "the battery low signal" is not input (NO in S108), the process returns to S101, and the steps described above are repeated.

In repeating the steps from S101 to S108 described above, if the current time does not belong to the battery usage period any more (NO in S107), the process proceeds to S110, and the power supply board 120 is instructed to select the AC adapter 111 as the power supply in S110.

By contrast, in S108, if it is determined that the remaining of the battery is decreasing (i.e., case of detecting input of "the battery low signal"), after enabling the improper termination flag in S109, the power supply is changed to the AC adapter 111 immediately in S110.

Figure 7:
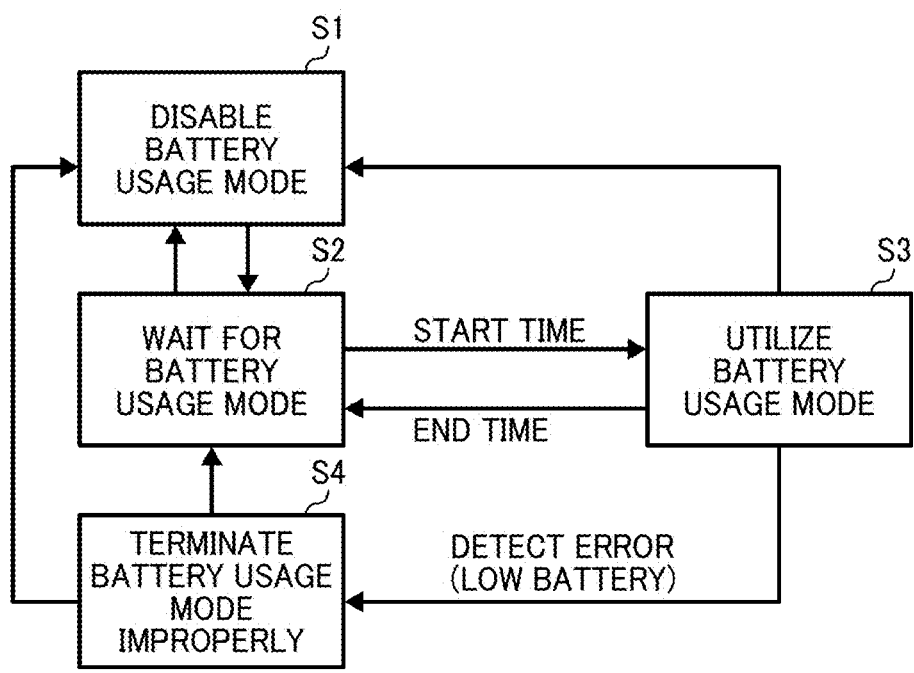
FIG. 7 is a diagram illustrating state transition of the battery usage mode as an embodiment of the present invention.

Next, the configuration of the battery usage mode in this embodiment is described below with reference to the diagram that illustrates state transition shown in FIG. 7. As shown in FIG. 7, in this embodiment, there are four states regarding the battery usage mode as shown below.

S1: The battery usage mode is invalid.
S2: The battery usage mode is idling.
S3: The battery usage mode is in use.
S4: The battery usage mode is terminated improperly.

Here, S1 indicates that it is unnecessary to use the battery usage mode or the condition to perform the battery usage mode is not satisfied even if it is necessary to perform the battery usage mode. In S1, if it is changed that the battery usage mode is necessary to use and the conditions for entering the second battery usage mode are satisfied, the state transitions to S2.

In S2, the battery usage period has not arrived yet in case the battery usage mode is set to be used and the preconditions for using the battery are satisfied. Therefore, the commercial power is selected as the power supply in S2, and the battery is charged during S2. If the battery usage mode is set not to be used in S2, the state transitions to S1.

In S3, the battery usage period has arrived already in case the battery usage mode is set to be used and the preconditions for using the battery are satisfied. If the start time of the battery usage period has arrived, the state transitions from S3 to S2, and the power supply changes from the battery to the commercial power. By contrast, if the end time of the battery usage period has arrived, the state transitions from S2 to S3, and the power supply changes from the commercial power to the battery. If the battery usage mode is set not to be used in 53, the state transitions to S1.

S4 is a state that the battery usage mode ends inappropriately in response to a case that the charge remaining of the battery reaches a predetermined threshold in S3. In S4, even if the battery usage period has arrived already in case the battery usage mode is set to be used and the preconditions for using the battery are satisfied, the power supply is set to the commercial power without using the battery. If the battery usage mode is set not to be used in S4, the state transitions to S1.

As described above, the battery usage mode in this embodiment can contribute to leveling electricity demand peaks in offices. For example, if the time slot during daytime hours is configured as the battery usage period for all of or part of the multiple MFP 100 located in the offices, it is possible to reduce the commercial power consumption during daytime hours when electric power demand reaches a peak, and the reduced power consumption shifts to nighttime hours with lower electric power demand. Consequently, peaks in electric power demand can be leveled.

The battery usage mode in the MFP 100 is described above. A transition control among operating modes in the MFP 100 and display of battery power in accordance with the operating modes is described below with reference to FIGS. 8 and 9.

Figure 8A:
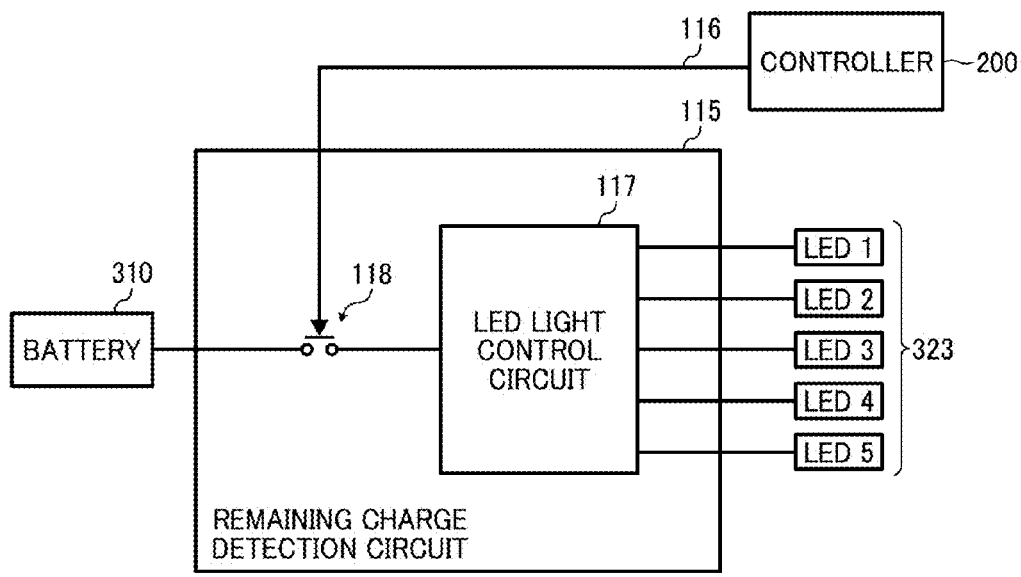
FIGS. 8A and 8B are diagrams illustrating a configuration of a remaining charge detection circuit in the power supply board included in the MFP as an embodiment of the present invention.
Figure 8B:
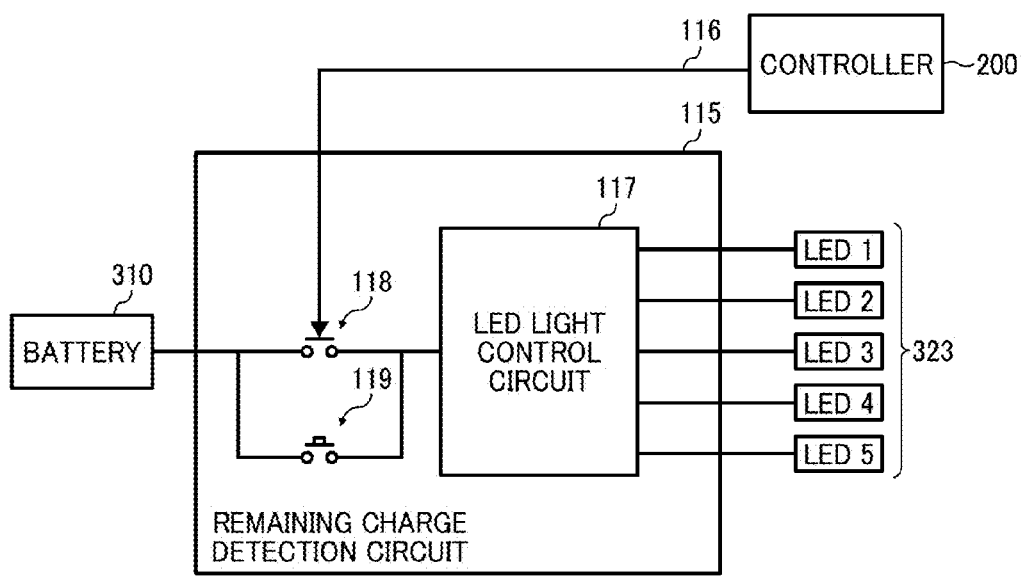

FIGS. 8A and 8B are diagrams illustrating a configuration of the remaining charge detection circuit 115 in the power supply board 120 included in the MFP 100 in this embodiment. As shown in FIGS. 8A and 8B, the remaining charge detection circuit 115 includes a LED light control circuit 117 that controls lighting a LED among five LEDs 323 corresponding to the detected voltage level.

In FIG. 8A, the controller 200 controls power supply to the LED light control circuit 117 in the remaining charge detection circuit 115. In the embodiment shown in FIG. 8A, the remaining charge detection circuit 115 includes a FET switch 118 that either sends or cuts power to the LED light control circuit 117 in accordance with a level of the power supply control signal from the controller 200 via a signal line 116, In the embodiment shown in FIG. 8A, pressing status of the switch 321 in FIG. 1 is sent to the controller 200 once, and electric power to the LED light control circuit 117 is either sent or cut under the control of the power supply control signal by the controller 200.

By contrast, in the embodiment shown in FIG. 8B, the remaining charge detection circuit 115 includes a switch 119 in parallel with the switch that either sends or cuts power to the power supply line in accordance with the power supply control signal from the controller 200. The switch 119 either sends or cuts electric power to the power supply line to the LED light control circuit 117 in response to the pressing status of the switch 321 in FIG. 1. In the embodiment shown in FIG. 8B, the pressing status of the switch 321 in FIG. 1 directly controls opening/closing of the switch 119, and power supply to the LED light control circuit 117 is controlled by either passing or cutting electric power to the two parallel power supply lines.

Preferably, since additional circuit designing is needed considering sneak current, etc., and since costs increase by adding parts if the commercial power supplies electric power to the remaining charge detection circuit 115, electric power to the remaining charge detection circuit 115 is supplied from the battery 310 in order to indicate the charge remaining. The LEDs 323 are turned on/off and the battery power is displayed or not displayed by controlling power supply to the LED light control circuit 117 in the remaining charge detection circuit 115. It is possible to select electric power supply to the remaining charge detection circuit 115 either from the commercial power or from the battery in accordance with whether or not "the battery low signal" or "the dead battery signal" exists similar to the selection of the driving power. In specific embodiments, the power supply source to the remaining charge detection circuit 115 is switched from the battery to the commercial power in accordance with the switching of driving power from the battery to the commercial power if the battery power becomes lower than a predetermined threshold value.

FIG. 9 is a flowchart illustrating a process of controlling energy consumption and indicating charge remaining on the battery executed by the MFP in this embodiment. In this embodiment, in the battery usage mode, higher energy-saving level than usual is demanded since it is desirable to extend battery life in order to level power consumption. As a result, while it is not limited, preferably, in the battery usage mode that the battery is selected as the driving power and the commercial power is attached, energy-saving control and battery power indicator control described below can be implemented.

The control process depicted in FIG. 9 starts in response to the MFP 100 transitioning to a normal mode (that displays the control panel, etc., and waits for user operation). The controller 200 determines whether or not an event that triggers transition to the energy-saving mode (hereinafter referred to as an energy-saving mode transition event) occurs in S201. In this case, the energy-saving mode transition event occurs if a certain period of time passes in idle status etc. The step S201 is repeated until the energy-saving mode transition event occurs (NO in S201). If it is determined that the energy-saving mode transition event occurs (YES in S201), the process proceeds to S202.

In order to transition to the energy-saving mode, the controller 200 sets the power supply control signal to off level and instructs the remaining charge detection circuit 115 to stop supplying power to the LED light control circuit 117 in S202. In response to the change of the power supply control signal by the controller 200, the remaining charge detection circuit 115 turns off the switch 118 and stops supplying power to the LED light control circuit 117 in S203. The controller 200 turns the apparatus into the sleep state except for a part of the ASIC 205 (a communication detection function that detects external communication and a wake-up function that wakes up the apparatus after detecting the external communication, stops supplying power to the most part of the controller 200 except the host I/F 206, the control panel 307, and the engine, and transitions to the energy-saving mode.

In the energy-saving mode, the process branches depending on whether or not the lighting switch 321 is pressed in S205. If the lighting switch is not pressed (NO in S205), the process proceeds to S206. The LED light control circuit 117 is turned off, and the charge remaining is not displayed in S206. Subsequently, the process proceeds to S207. By contrast. if the lighting switch 321 is pressed and it is instructed to display the charge remaining using the LEDs 323 (YES in S205), the process proceeds to S208. The LED light control circuit 117 is turned on, and the charge remaining is displayed in S208. Subsequently, the process proceeds to S207.

In this embodiment, it is assumed that the lighting switch 321 is pressed as the user instruction to display the charge remaining, and it is assumed that the lighting switch 321 is released as the user instruction not to display the charge remaining. Consequently, if the lighting switch 321 is released after being depressed, the LED light control circuit 117 is turned off and the charge remaining is not displayed in S206. In FIG. 8A, the controller 200 maintains its function to output the power supply signal to the remaining charge detection circuit 115 via the signal line 116 in the energy-saving mode depending on the status of the lighting switch 321. In FIG. 8B, the switch 119 in the remaining charge detection circuit 115 is turned on/off depending on the status of the lighting switch 321, and the lighting switch 321 directly controls the power supply status of the LED light control circuit 117.

In S207, the active part of the ASIC 205 (the wake-up function) determines whether or not an event that triggers returning from the energy-saving mode (hereinafter referred to as a recovery event) has occurred. In this case, the recovery event occurs in case of detecting external communication such as USB and LAN and detecting that the start button on the control panel is pressed etc. Until the recovery event occurs (NO in S207), the step S207 is repeated. If it is determined that the recovery event occurs (YES in S207), the process proceeds to S209.

In S209, the active part of the ASIC 205 (the wake-up function) transitions the remaining parts of the ASIC 205 from the sleep status to the normal status, starts supplying power to the parts of the controller 200 that has been stopped supplying power, the control panel 307, and the engine, and transitions to the normal mode. In S210, after returning from the energy-saving mode, the controller 200 turns the power supply control signal to the remaining charge detection circuit 115 into on level and instructs to start supplying power to the LED light control circuit 117, In response to the change of the power supply control signal by the controller 200, the remaining charge detection circuit 115 turns on the switch 118 and starts supplying power to the LED light control circuit 117 in S211. Next, the process returns to S201, and the steps described above are repeated.

In the embodiment described above, in the information processing apparatus that use the battery as the driving power, it is possible to display the status of the battery in accordance with the operating modes of the information processing apparatus and reduce power consumption used for displaying the status.

It is widely needed to reduce electric power in the information processing apparatuses. In the embodiment described above, electric power supply to the status indicator of the battery is appropriately controlled in accordance with the operating modes of the information processing apparatus. It is strongly demanded to extend running time of the battery in the battery usage mode described above. It is possible to reduce unnecessary power consumption and extend the running time of the battery by applying the configuration described above.

In the embodiment described above, a multifunctional inkjet printer is used as the information processing apparatus of the present invention. However, the present embodiment is not limited to the case described above, and it is possible to apply the present invention to a single-functional printer that implements the printing function only and various single-functional devices that implement a scanner function, facsimile function, projection function, and camera function.

In the energy saving control described above, it is controlled to transition between two modes, one is the energy saving mode, and the other is the normal mode that supplies more power than the energy saving mode and accepts user operation. However, the operating modes in which the MFP 100 can run is not limited to the case described above, and it is possible to set up multiple operating modes in accordance with multilevel power supply. For example, it is possible to set up a Suspended To RAM (STR) mode that stores the current operating status in the RAM 203 and stops supplying power to most devices such as the CPU 201 in the controller 200 and the HDD, etc., and a controller-off mode that stops supplying power to devices including the RAM 203. In the embodiment described above, the charge remaining of the battery is displayed as displaying the status of the battery.

However, in other embodiments, it is possible to display other status such as error of the battery, and it is possible to display whatever status of the battery, In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as an image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The present invention also encompasses a non-transitory recording medium storing a program that executes a control method for an information processing apparatus. The control method includes the steps of displaying a remaining charge status of a battery using a status indicator of the information processing apparatus, controlling an operating mode of the information processing apparatus and power supply to the status indicator, the operating mode including at least an energy saving mode, accepting user instruction for displaying the status of the battery using the status indicator, stopping power supply to the status indicator in transitioning to the energy saving mode, starting power supply to the status indicator in response to accepting the user instruction for displaying in the energy saving mode, and stopping power supply to the status indicator in response to releasing the user instruction for displaying in the energy saving mode.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An information processing apparatus, comprising:
a remaining charge detector to detect charge remaining in a battery;
a status indicator to display status of the battery based on an output of the remaining charge detector;
a controller to control an operating mode of the information processing apparatus and power supply to the status indicator, the operating mode at least including an energy save mode; and
an instruction acceptance unit to accept user instruction for displaying the status of the battery using the status indicator,
wherein the controller stops power supply to the status indicator by switching a power supply control signal for the remaining charge detector in transitioning to the energy saving mode, and, while still in the energy saving mode, starts power supply to the status indicator by switching the power supply control signal for the remaining charge detector in response to the instruction acceptance unit accepting the user instruction for displaying and stops power supply to the status indicator by switching the power supply control signal for the remaining charge detector in response to releasing the user instruction for displaying.

2. The information processing apparatus according to claim 1, further comprising a switching unit to select either the battery or commercial power as driving power,
wherein the controller supplies power to the status indicator if the battery is selected as the driving power and the commercial power is connected to the information processing apparatus.

3. The information processing apparatus according to claim 2, wherein the switching unit selects the commercial power to supply electric power to the status indicator in lieu of the battery if the charge remaining on the battery is below a threshold value.

4. The information processing apparatus according to claim 2, wherein, in a case in which both commercial power and battery power are available, the controller selects the battery as the driving power in response to arrival of a predetermined battery usage period and selects the commercial power as the driving power in response to the predetermined battery usage period expiring.

5. The information processing apparatus according to claim 1, wherein the controller turns on the status indicator in transitioning to a predetermined mode that supplies more power than the energy saving mode, and the status indicator displays the status of the battery in the predetermined mode regardless of the instruction accepted at the instruction acceptance unit.

6. The information processing apparatus according to claim 1, wherein the energy save mode is a mode in which the controller at least maintains a function that detects external communication and a function that wakes up the information processing apparatus in response to detecting the external communication, while stopping power supply to an engine of the information processing apparatus.

7. The information processing apparatus according to claim 1, wherein the status indicator includes one or more light emitting elements, which are illuminated so as to reflect charge remaining of the battery.

8. The information processing apparatus according to claim 1, wherein the status indicator and the instruction acceptance unit are a single unit.

9. The information processing apparatus according to claim 1, wherein the remaining charge detector includes a control circuit to control power supply to the status indicator, based on the power supply control signal from the controller.

10. A method of controlling an information processing apparatus, comprising the steps of:
  displaying, using a status indicator of the information processing apparatus, a remaining charge status of a battery;
  controlling an operating mode of the information processing apparatus and power supply to the status indicator, the operating mode at least including an energy save mode;
  accepting user instruction for displaying the status of the battery using the status indicator;
  stopping power supply to the status indicator in transitioning to the energy saving mode by switching a power supply control signal for the remaining charge detector;
  starting power supply to the status indicator in response to accepting the user instruction for displaying in the energy saving mode by switching the power supply control signal for the remaining charge detector; and
  stopping power supply to the status indicator in response to releasing the user instruction for displaying in the energy saving mode by switching the power supply control signal for the remaining charge detector.

11. The method of controlling the information processing apparatus according to claim 10, further comprising the steps of:
  selecting either the battery or commercial power as driving power; and
  controlling supplying power for displaying the status of the battery if the battery is selected as the driving power and the commercial power is connected to the information processing apparatus.

12. The method of controlling the information processing apparatus according to claim 10, further comprising the steps of:
  turning on the status display in transitioning to a predetermined mode that supplies more power than the energy saving mode; and
  displaying the status of the battery in the predetermined mode regardless of the user instruction for displaying.

13. The method of controlling the information processing apparatus according to claim 10, wherein the energy save mode is a mode in which the information processing apparatus is capable of performing the steps of:
  detecting an external communication and waking up the information processing apparatus in response to detecting the external communication in the energy saving mode; and
  stopping supplying power to an engine of the information processing apparatus.

* * * * *